United States Patent
Proschek

[11] Patent Number: 5,951,093
[45] Date of Patent: Sep. 14, 1999

[54] LINE LEADING ARRANGEMENT FOR A MOTOR VEHICLE

[75] Inventor: Walter Proschek, Stuttgart, Germany

[73] Assignee: Daimler-Benz Aktiengesellschaft, Germany

[21] Appl. No.: 09/064,759

[22] Filed: Apr. 23, 1998

[30] Foreign Application Priority Data

Apr. 23, 1997 [DE] Germany .......................... 197 17 041

[51] Int. Cl.$^6$ ...................................................... B60J 1/20
[52] U.S. Cl. ................ 296/152; 296/146.11; 296/146.12
[58] Field of Search ............................... 296/152, 146.11, 296/146.12, 136, 107.08, 76, 208; 138/118

[56] References Cited

U.S. PATENT DOCUMENTS

| | | | |
|---|---|---|---|
| 4,653,799 | 3/1987 | Arai et al. | 296/146.12 |
| 4,862,011 | 8/1989 | Wright | 296/152 |
| 5,000,227 | 3/1991 | Beran et al. | 138/118 |
| 5,435,406 | 7/1995 | Gaffoglio et al. | 296/146.12 |
| 5,466,036 | 11/1995 | Stroeters et al. | 296/146.11 |
| 5,588,260 | 12/1996 | Suzuki et al. | 296/208 |
| 5,716,044 | 2/1998 | Peterson et al. | 296/152 |
| 5,775,764 | 7/1998 | Yamashita | 296/76 |
| 5,788,312 | 8/1998 | Lee | 296/76 |

FOREIGN PATENT DOCUMENTS

| | | |
|---|---|---|
| 0 282 389 B1 | 9/1988 | European Pat. Off. . |
| 38 72 735 T2 | 3/1993 | Germany . |
| 41 19 214 C2 | 2/1994 | Germany . |
| 44 12 812 A1 | 10/1995 | Germany . |
| 108722 | 7/1983 | Japan . |
| 23224 | 2/1984 | Japan . |
| 217874 | 8/1998 | Japan . |
| 285763 | 10/1998 | Japan . |
| 285764 | 10/1998 | Japan . |

OTHER PUBLICATIONS

Translation of the Official Letter of Provisional Rejection.

*Primary Examiner*—Joseph D. Pape
*Assistant Examiner*—Kiran Patel
*Attorney, Agent, or Firm*—Evenson, McKeown, Edwards & Lenahan, P.L.L.C.

[57] ABSTRACT

A line-leading arrangement for a motor vehicle has a covering pivotally connected on the vehicle body side, particularly a rear lid, for a motor vehicle opening, for the connection of subassemblies arranged in the covering. At least one line is provided which, for this purpose, bridges a distance between a vehicle body part and the covering. The covering is movable between a first and a second end position. A pull-back device is provided which, for adapting the at least one line to the distance which changes when the covering is moved between its two end positions, exercises a force onto the at least one line. The at least one line, with the aid of the exercised force, is guided along an ideal course and is displaced on the vehicle body side and/or on the covering side.

9 Claims, 4 Drawing Sheets

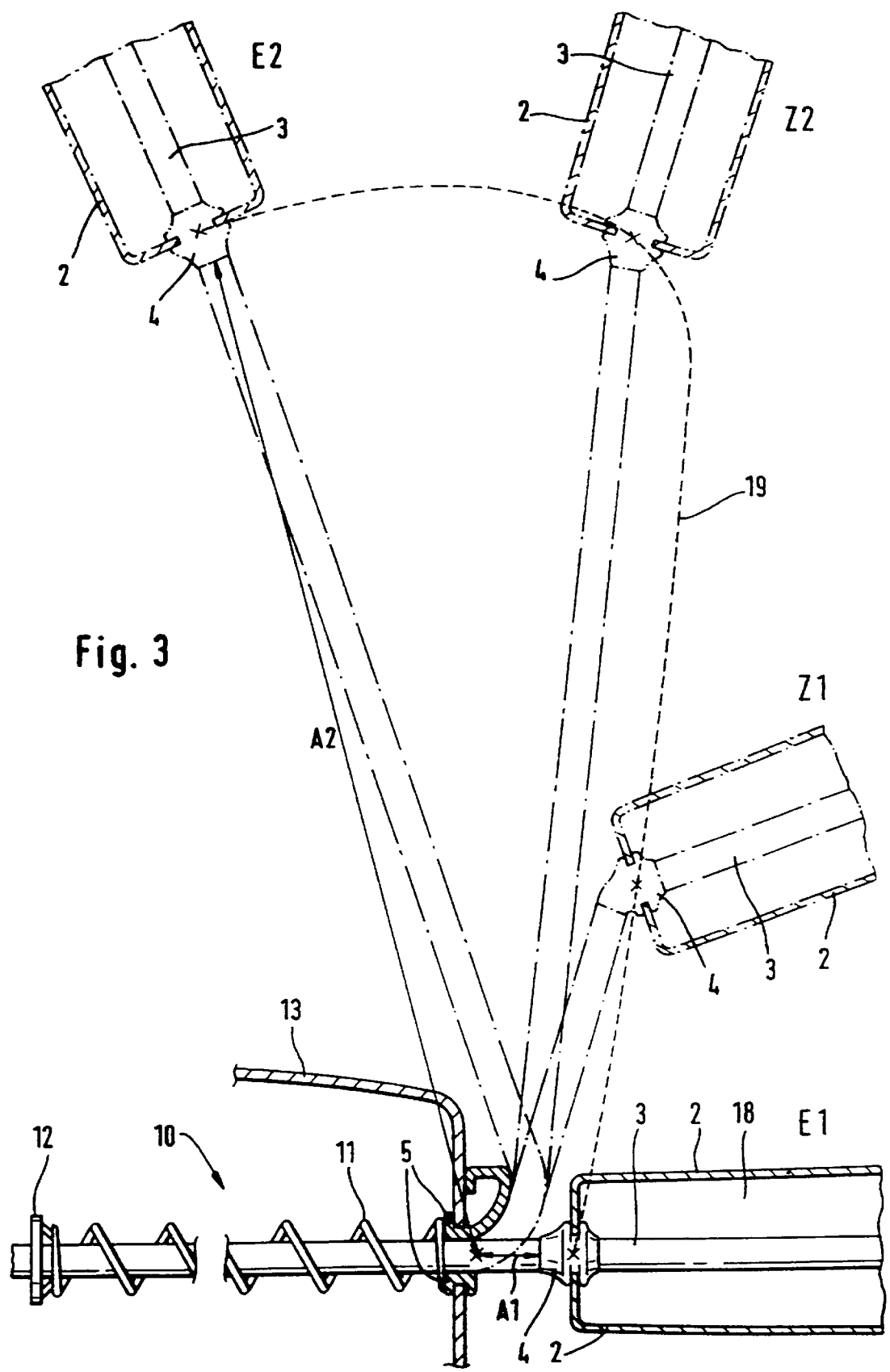

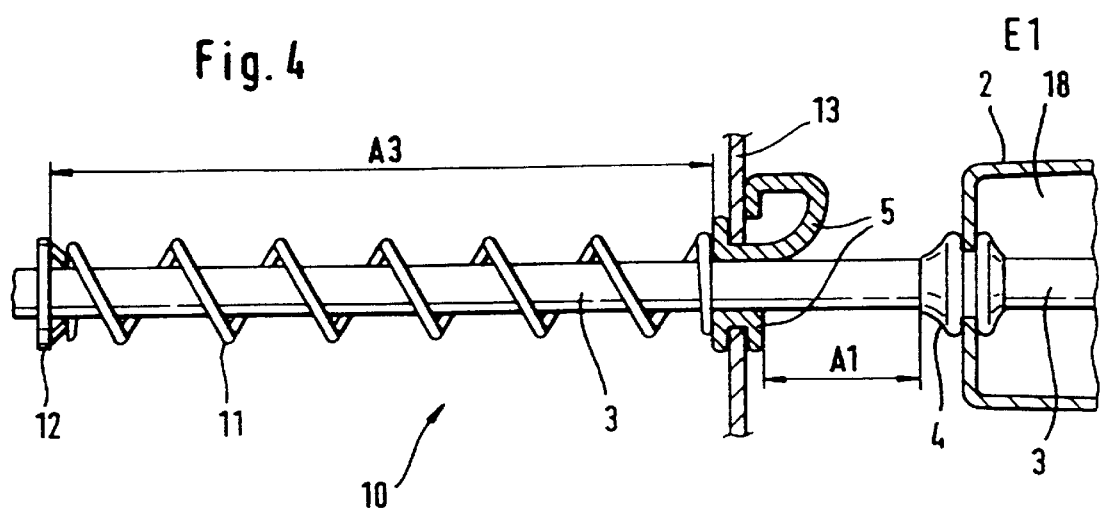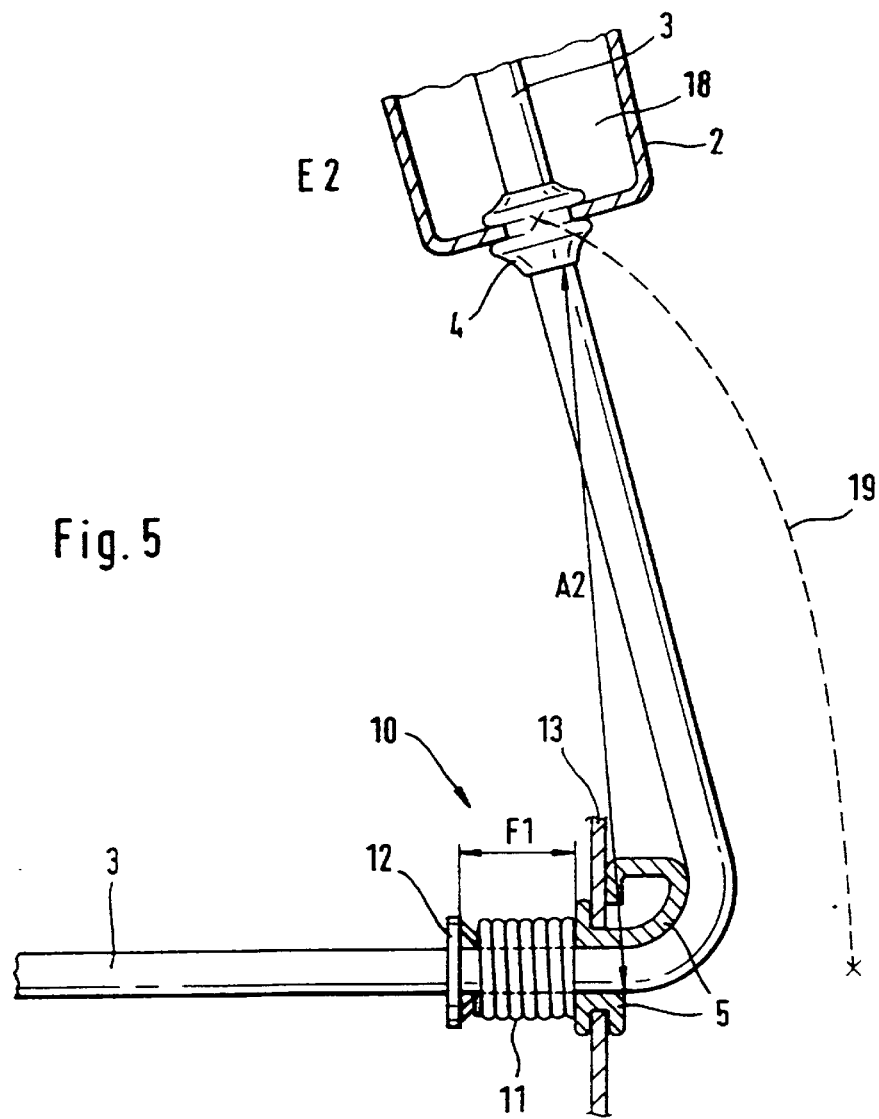

LINE LEADING ARRANGEMENT FOR A MOTOR VEHICLE

BACKGROUND AND SUMMARY OF THE INVENTION

This application claims the priority of German application 197 17 041.2, filed Apr. 23, 1997, the disclosure of which is expressly incorporated by reference herein.

The present invention relates to a line-leading arrangement for a motor vehicle having a covering, particularly a rear lid but also for sliding roofs, sliding doors, engine hoods, etc., for a motor vehicle opening, with electric and/or fluidic subassemblies being arranged in the covering, and more particularly, to an arrangement for the connection of subassemblies arranged in the covering, at least one line being provided which, for this purpose, bridges a distance between a vehicle body part and the covering, the covering being movable between a first and a second end position, a pull-back device being provided which, for adapting the at least one line to the distance which changes during the movement of the covering between its two end positions, exercises a force on the at least one line, and the at least one line, with the aid of the exercised force, being displaced on the vehicle body side and/or the covering side.

In modern motor vehicles, various electric and/or fluidic subassemblies, such as rear lights of different types, brake lights, backup lights, fog lights, etc., antenna systems, sensor systems, or pneumatic consuming devices, such as control elements for a locking system or for a retractable handle, are integrated into the various coverings for motor vehicle openings, for example, into the rear lid or trunk cover. For connecting the above-mentioned subassemblies to a current or fluid supply or to a control unit, at least one line must be provided which, for this purpose, bridges a distance between a vehicle body part and a covering, and a line can be an electric cable as well as a fluid hose.

The bridging of the distance between the vehicle body part and the covering must also be ensured during a movement of the covering between its two end positions. For this purpose, in the case of known vehicles, for example, the Mercedes-Benz W 140 Series, the at least one line is led from a control unit or an electric or fluidic supply system within vehicle body parts, such as members or supports, and/or between the vehicle body parts and vehicle body panelling parts to an opening with a vehicle body lead-through. From there, the at least one line is led through the vehicle body lead-through to a hinged lever which is part of a rear lid hinge. Subsequently, the at least one line is led within the hinged lever to an opening with a covering lead-through in the covering and/or a covering panelling part, where the at least one line enters the hollow area of the rear lid and is further distributed to the subassemblies. Normally, the lead-throughs are constructed as rubber bushings.

In the known construction arrangement of the swivel hinges are arranged in the so-called wet area may be seen as disadvantageous. That is, in an area in which, when driving through rain, more and more water will collect, the at least one line is increasingly subjected to stress caused by weather-related influences (moisture, coldness), which results in a faster material fatigue, and the above-mentioned openings in the vehicle body parts and in the covering tend to corrode. Also, with multipart swivel hinges, which carry out more than a simple rotating movement, there is the danger that the at least one line is squeezed and/or bent.

DE 38 72 735 T2, for example, discloses a line arrangement for a motor vehicle having a covering for a motor vehicle opening pivotally connected on the vehicle body side. For the connection of subassemblies arranged in the covering, at least one line is provided which, for this purpose, bridges a distance between a vehicle body part and the covering. The covering is movable between a first and a second end position, and a pull-back device is provided which, for adapting the at least one line to the distance which changes during the movement of the covering between its two end position, exercises a force on the at least one line. The at least one line with the aid of the exercised force, is displaced on the vehicle body side or the covering side. No measures are provided for preventing damage to the at least one line, particularly a fluidic conduit, as the result of squeezing or rubbing on an edge, and this may be perceived as disadvantageous.

An object of the invention is to provide a line-leading arrangement for a motor vehicle having a covering for a motor vehicle opening to avoid the above-mentioned disadvantages.

According to the present invention, this object has been achieved by providing that the at least one line, with the aid of the exercised force, is guided along an ideal course through a vehicle body lead-through and a covering lead-through such that the permissible bending load of the at least one line is not exceeded.

A basic concept of the present invention resides in constructing the at least one line to be displaceable on the vehicle body side and/or the covering side for the adaptation of at least one line to a distance between a vehicle body part and a covering which changes when the covering is moved between two end positions. For the displacement of the at least one line, a pull-back device is provided which exercises force on the at least one line. Thereby, it is advantageously ensured that, for bridging the distance between the vehicle body part and the covering, the at least one line is led in a tensioned condition along an ideal course.

The ideal course need not correspond to the shortest connection course between the vehicle body part and the covering but only ensures that the permissible bending load of the at least one line is not exceeded, and that the at least one line does not rub against edges or similar points, in order to avoid damage to the at least one line. As the result of the tensioned condition of the at least one line, the at least one line is prevented from loops in which objects may become hung up which may also result in damage to the at least one line. The distance between the vehicle body part and the covering is the distance between a vehicle body lead-through and a covering lead-through through which the at least one line is led.

For guiding the line, in addition to the pull-back device, a depositing space is provided for receiving a certain excessive length of the line. By way of the effect of force of the pull-back device on the at least one line during the movement of the covering from a second into a first end position, this line excess is pulled back into the provided depositing space. During the movement of the covering from the first into the second end position; for the release of the line excess from the depositing space, the force effect of the pull-back device on the at least one line must be overcome.

The pull-back device and the depositing space may be arranged on the vehicle body side within the vehicle body and/or between the vehicle body and a vehicle body paneling part or, on the covering side, in a hollow space of the covering and/or between the covering and a covering paneling part. In the vehicle-body-side arrangement, the at least one line is displaceably constructed in the vehicle body lead-through and is fixedly constructed in the covering lead-through. In the covering-side arrangement, the at least one line is fixedly arranged in the vehicle body lead-through and is displaceably arranged in the covering lead-through.

According to a particularly advantageous feature of the present invention, the pull-back device and the storage space are integrated in a housing. The housing is arranged on the vehicle body side in the trunk between the vehicle body and a vehicle body paneling part. The housing can, however, be arranged in a hollow area of the covering or between the covering and a covering paneling. As a function of the arrangement of the housing, the at least one line is constructed to be displaceable either in the vehicle body lead-through or in the covering lead-through, whereby the vehicle body lead-through or the covering lead-through may be constructed as part of the pull-back device. As the result of the effect of the force of the pull-back device on the at least one line, this line always remains tensioned, and a squeezing and/or bending of the at least one line during the movement of the covering between its end positions is almost avoided.

The above-described present invention allows the line guiding of the at least one line to be carried out independently of existing hinge devices and to therefore always take place in the dry area of the vehicle. Thereby, the at least one line is not exposed to weather influences, and a premature material fatigue is avoided.

BRIEF DESCRIPTION OF THE DRAWINGS

Other objects, advantages and novel features of the present invention will become apparent from the following detailed description of the invention when considered in conjunction with the accompanying drawings wherein:

FIG. 3 is a schematic partial view of a line lead in accordance with the present invention;

FIG. 4 is a schematic partial view of the line lead shown in FIG. 3 in a first end position of the covering;

FIG. 5 is a schematic partial view of the line lead shown in FIGS. 3 and 4 but in a second end position of the covering.

DETAILED DESCRIPTION OF THE DRAWINGS

Figure 1:
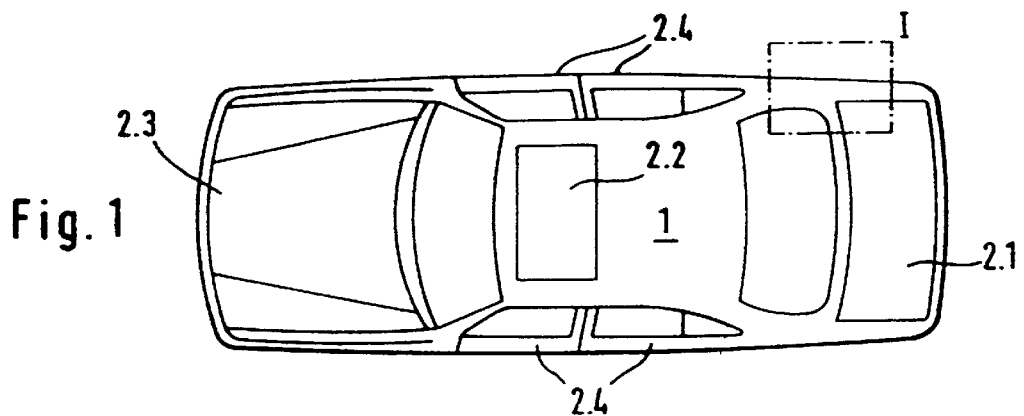
FIG. 1 is a top plan view of a motor vehicle having coverings.

FIG. 1 illustrates a motor vehicle 1 with various coverings for motor vehicle openings, as, for example, a rear lid 2.1, a sliding roof 2.2, an engine hood 2.3 and several doors 2.4, with the rear lid 2.1 being shown in its first end (or closed) position.

Figure 2:
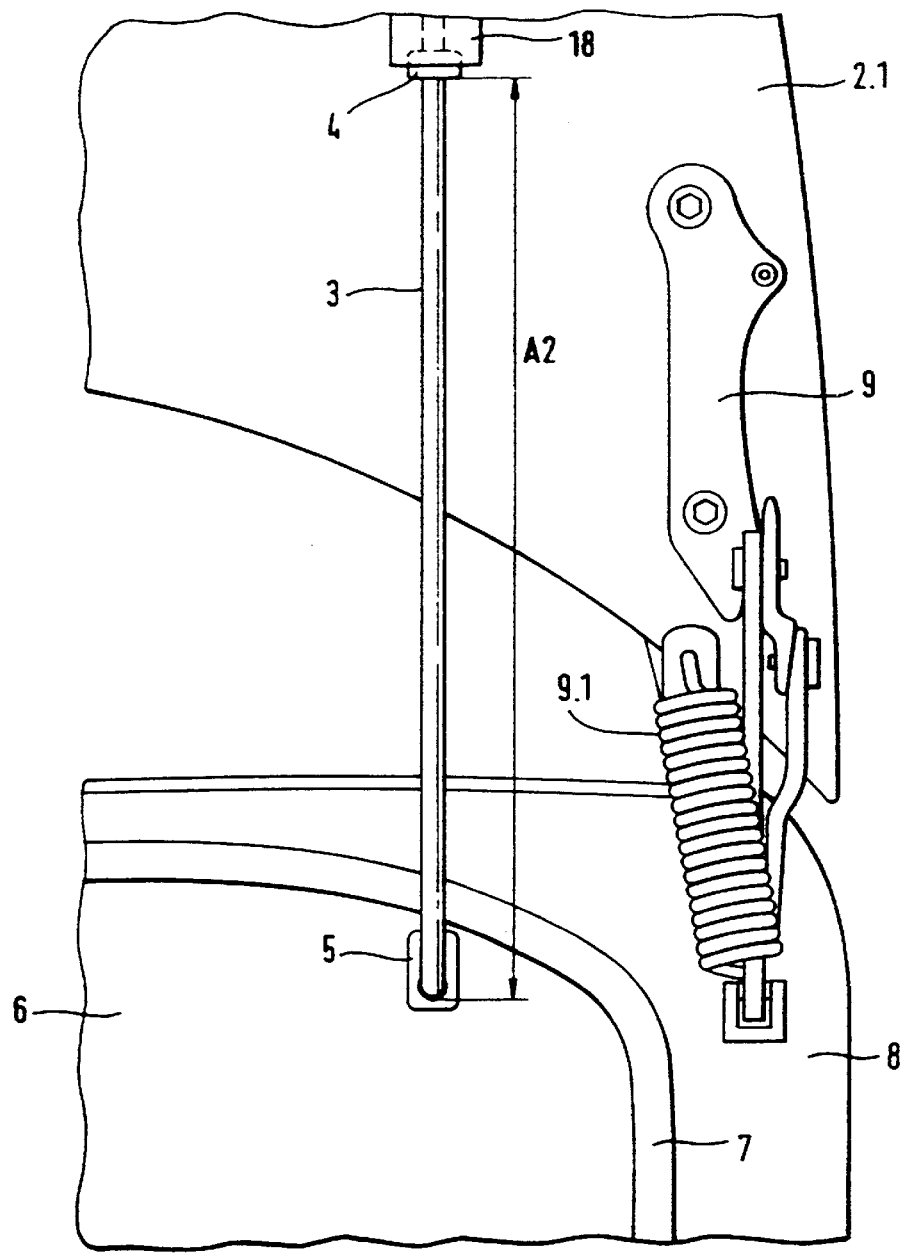
FIG. 2 is a schematic partial view of a detail of the rear lid area of the motor vehicle shown in FIG. 1 as designated by the dot-dash rectangular section.

FIG. 2 is an enlarged representation of a cutout from FIG. 1 marked I, the rear lid 2.1 being shown in its second end (open) position. The rear lid 2.1 is pivotally connected on the vehicle body side by a hinge arrangement 9 having a relieving spring 9.1 and can be moved between the two end positions. For the connection of conventional electric or fluidic subassemblies arranged in the rear lid to likewise conventional vehicle-body-side control units or fluidic or electric supply systems in a known manner, at least one line 3 is used. The at least one line 3 bridges a distance A2 between a vehicle body lead-through 5 and a covering lead-through 4. Behind the covering lead-through, the at least one line 3 is led farther within a hollow covering space 18 and is distributed to the corresponding subassemblies. The line lead between the vehicle body lead-through 5 and the covering lead-through 4 when the rear lid 2.1 is closed (covering is in the first end position) is within the so-called dry area 6 of the trunk which is separated from the so-called wet area by a known type of sealing arrangement 7.

As illustrated in FIG. 3, a line-leading arrangement for a motor vehicle with a covering 2 for a motor vehicle opening pivotally connected on the vehicle-body-side has at least one line 3. A vehicle body lead-through 5 is arranged in an opening through a vehicle body part or a vehicle body paneling part 13. A covering lead-through 4 is arranged in an opening of the covering or of a covering paneling part 2. A pull-back device 10 is arranged on the vehicle body side and is constructed in the illustrated embodiment as a pressure spring 11 with a stop ring 12. The at least one line 3 is used for the connection of known types of electric and/or fluidic subassemblies to control units which are arranged on the vehicle body side or to electric or fluidic supply systems. For this purpose, the at least one line 3 bridges a distance between the vehicle body lead-through 5 and the covering lead-through 4, in which the covering 2 can be moved between a first and a second end position E1, E2.

Because of the movement of the covering 2 between its end positions E1, E2, the distance will change, in which case the distance may assume values between a minimal distance A1, which exists here in the first end position E1 of the covering 2, and a maximal distance A2 which exists in the second end position E2 (as illustrated in dot-dash lines) of the covering 2. The movement of the covering 2 between its two end positions E1, E2 in this case takes place along a line 19 (dash line) which is defined by the multipart hinge arrangement 9 illustrated in FIG. 2 which connects the covering 2 with the vehicle body part 13.

In addition to the end position E1, FIG. 3 also shows by way of a broken line the end position E2 and two intermediate positions Z1, Z2 through which the covering passes in its movement between its two end positions E1, E2.

The illustrated pull-back device 10 in FIG. 3 includes a pressure spring 11 and of a stop ring 12 for the pressure spring 11. The stop ring 12 is fixedly connected with the at least one line. As an alternative, the stop ring 12 may be constructed as part of a line cover and may be molded thereto.

FIG. 4 shows the line leading arrangement for a motor vehicle in which the covering 2 for a motor vehicle opening is in its first end position E1. The figure shows a simple vehicle-body-side construction of the pull-back device 10 with a pressure spring 11 and a stop ring 12. Alternatively, a tension spring can be used in lieu of the pressure spring. The at least one line 3, in this position of the covering 2, bridges the minimal distance A1 between the vehicle body lead-through 5 and the covering lead-through 4. The pressure spring 11 of the pull-back device 10 is in a relaxed position and holds back a line excess for the adaptation to the distance between the vehicle body lead-through 5 and the covering lead-through 4, which changes during the movement of the covering 4, in a depositing space provided for this purpose within a hollow space of the vehicle body part or between a vehicle body part and a vehicle body paneling part.

The size of the required depositing space depends on the necessary line excess for bridging a maximal distance A2 (as seen in FIG. 5) between the vehicle body lead-through 5 and the covering lead-through 4. The line excess corresponds to the distance A3 of the stop ring 12 from the vehicle body lead-through 5 and consists at least of the sum of the maximal distance A2 (FIG. 5) and of the pressure spring length F1 in the completely tensioned condition of the pressure spring 11 (A3=A2+F1).

FIG. 5 also illustrates the line leading arrangement for a motor vehicle in which the covering 2 for a motor vehicle opening is in its second end position E2. In this position of the covering 2, the at least one line 3, along an ideal course, bridges the maximal distance A2 between the vehicle body lead-through 5 and the covering lead-through 4. In this case, the pressure spring 11 of the pull-back device 10 is in a tensioned condition and the line excess is used for bridging the maximal distance A2. When the covering 2 is moved along the movement course 19 which is defined, for example, by a multipart hinge arrangement 9 illustrated in FIG. 2, corresponding to the changing distance between the vehicle body part lead-through 5 and the covering lead-through 4, parts of the line excess are used for the adaptation of the at least one line 3 to the changing distance. By the effect of the force of the pull-back device 10 on the at least one line 3, always only a portion of the line excess is released for adapting the at least one line 3 to the changing distance. As a result, the at least one line 3 is almost always prevented from forming unnecessary loops in which objects may become hung up and may damage the at least one line 3.

Figure 6:
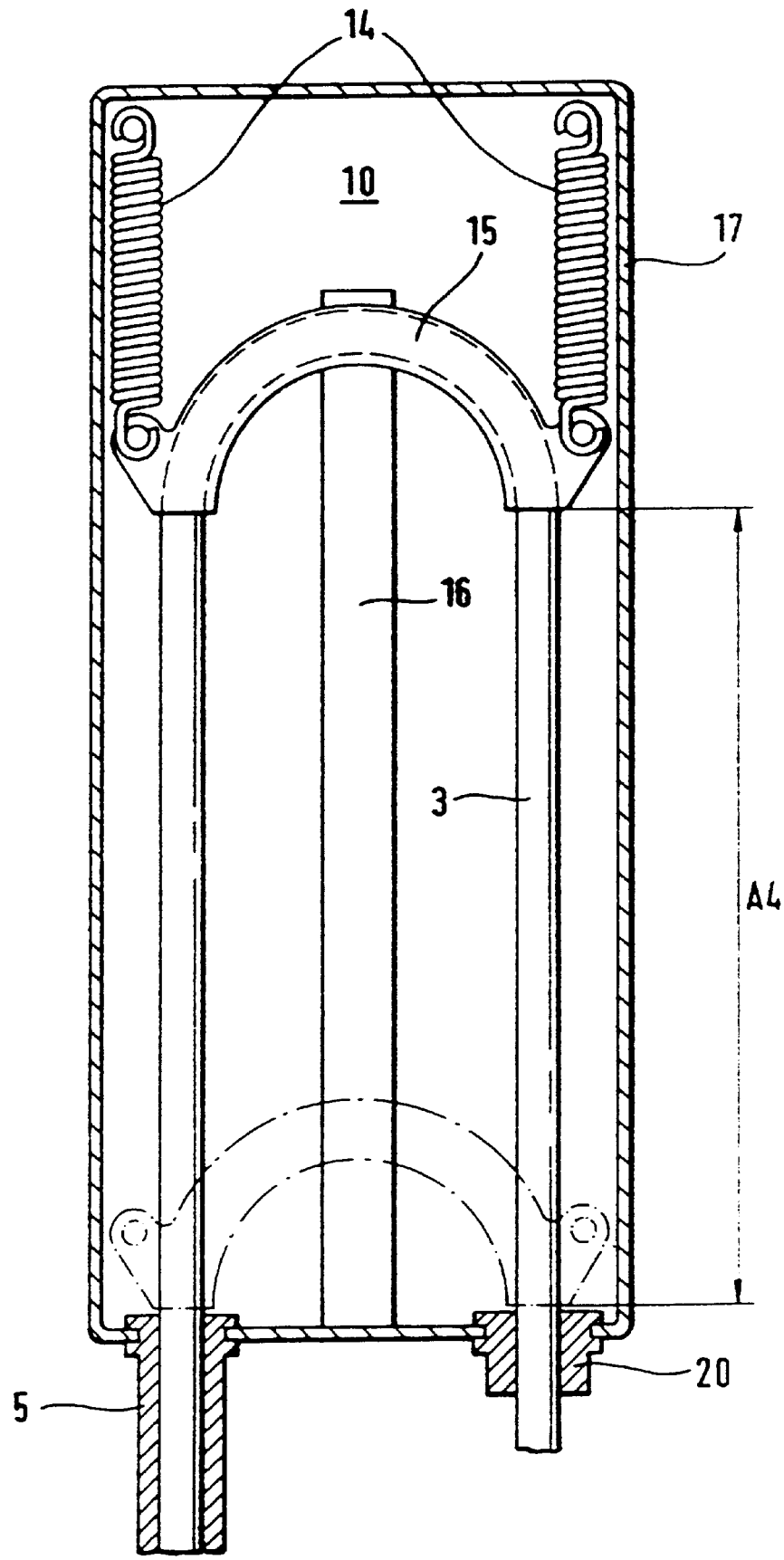
FIG. 6 is a schematic view of an embodiment of the pull-back device.

FIG. 6 illustrates a particularly advantageous embodiment of the pull-back device 10 and comprises a housing 17, a carriage 15 which can be moved along a linear guide 16 for guiding the at least one line 3, and a spring device 14 which includes two tension springs. The tension springs are connected by one end with the movable carriage 15 and by the other end with the housing 17. A line lead-through 20 has the at least one line 3 fixed therein in a non-displaceable manner. As the second line lead-through in which the at least one line 3 is arranged in a displaceable manner, the vehicle body lead-through 5 is used.

When the covering 2 is in its first end position, the movable carriage 15 of FIG. 6 is situated at the upper end of the linear guide 16, and the tension springs of the spring device 14 are relaxed. The line excess for adapting the line 3 to the changing distance is situated completely inside the housing 17 of the pull-back device 10. For this purpose, the at least one line 3 is guided behind the line lead-through 20 within the housing 17 by way of the movable carriage 15 to the vehicle body lead-through 5. When the covering 2 is in its second end position, the movable carriage 15 (as shown in dot-dash lines) is at the lower end of the linear guide 16 and the two tension springs of the spring device 14 are tensioned. The line excess for adapting the line 3 to the changing distance is situated completely outside the housing 17 of the pull-back device 10 and is used for bridging the maximal distance A2 between the vehicle body lead-through 5 and the covering lead-through 4. In the semicircular carriage, a guide groove is advantageously shaped out for guiding the line, the radius of the guide groove being selected such that the maximal bending load of the at least one line is not exceeded. This measure prevents a premature material fatigue of the at least one line 3.

Instead of the guide groove, several rollers may also be arranged on the movable carriage for guiding the at least one line. Another advantage of the embodiment according to FIG. 6 resides in the fact that, because of the deflecting characteristic of the movable carriage 15, the depth of the required depositing space for receiving the required line excess is cut in half. The required line excess corresponds to twice the distance A4 of the movable carriage from the line lead-through 20. Alternative embodiments of the spring device 14 are also possible. Thus, instead of tension springs, pressure springs may be used, or instead of two springs, only one spring may be used. The illustrated pull-back device 10 may be arranged in a hollow vehicle body space or in a hollow space between a vehicle body part and a vehicle body paneling part.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Line-leading arrangement for a motor vehicle in which a covering is pivotally linked to a vehicle body side for covering a motor vehicle opening, comprising at least one line arranged to bridge a distance between a vehicle body part and the covering for connection of at least one subassembly arranged in the covering which is operatively arranged to be movable between a first and a second end position, and a pull-back device operatively associated with the at least one line, for adapting the at least one line to the distance which changes during movement of the covering between two end positions thereof by exercising a force on the at least one line, which at least one line, by way of the exercised force, is displaced on at least one of the vehicle body side and the covering side and is guided along a desired course through a vehicle body lead-through and a covering lead-through such that the permissible bending load of the at least one line is not exceeded.

2. The line leading arrangement according to claim 1, wherein guiding devices are configured onto the vehicle body lead-through to ensure that at least a defined minimal bending radius for the at least one line is maintained.

3. The line leading arrangement according to claim 1, wherein the at least one line is arranged such that, on the vehicle body side, displacement takes place in the vehicle body lead-through and, on a covering side, takes place in the covering lead-through.

4. The line leading arrangement according to claim 1, wherein the pull-back device is operatively arranged on the vehicle body side.

5. The line leading arrangement according to claim 3, wherein the vehicle body lead-through comprises part of the pull-back device.

6. The line leading arrangement according to claim 1, wherein the pull-back device is operatively arranged on a covering side.

7. The line leading arrangement according to claim 1, wherein the at least one line is arranged so as to be guided in a dry area of the vehicle.

8. The line leading arrangement for a motor vehicle according to claim 1, wherein a housing comprises the pull-back device and a depositing space associated therewith.

9. The line leading arrangement according to claim 1, wherein the pull-back device comprises a housing, a linear guide, a carriage movably arranged in the linear guide, a spring device and a line lead-through, the at least one line being fixedly arranged in the line lead-through, and displaceably arranged in the vehicle body lead-through.

* * * * *